United States Patent
Shechter

(10) Patent No.: US 9,002,086 B2
(45) Date of Patent: Apr. 7, 2015

(54) SYSTEM AND METHOD FOR GENERATING A TOMOGRAPHIC RECONSTRUCTION FILTER

(75) Inventor: Gilad Shechter, Haifa (IL)

(73) Assignee: Koninklijke Philips N.V., Eindhoven (NL)

( * ) Notice: Subject to any disclaimer, the term of this patent is extended or adjusted under 35 U.S.C. 154(b) by 357 days.

(21) Appl. No.: 13/266,472

(22) PCT Filed: Apr. 9, 2010

(86) PCT No.: PCT/IB2010/051540
§ 371 (c)(1),
(2), (4) Date: Oct. 27, 2011

(87) PCT Pub. No.: WO2010/128413
PCT Pub. Date: Nov. 11, 2010

(65) Prior Publication Data
US 2012/0045108 A1   Feb. 23, 2012

Related U.S. Application Data

(60) Provisional application No. 61/176,230, filed on May 7, 2009.

(51) Int. Cl.
*G06K 9/00* (2006.01)
*G06T 11/00* (2006.01)

(52) U.S. Cl.
CPC ......... *G06T 11/005* (2013.01); *G06T 2211/421* (2013.01)

(58) Field of Classification Search
None
See application file for complete search history.

(56) References Cited

U.S. PATENT DOCUMENTS

| 5,319,696 | A  | * | 6/1994  | Abdel-Malek et al. | 378/108 |
| 6,868,137 | B2 | * | 3/2005  | Inoue              | 378/98.4 |
| 6,901,130 | B2 |   | 5/2005  | Bruder et al.      |         |
| 7,327,895 | B2 | * | 2/2008  | Kaltschmidt        | 382/260 |
| 7,333,647 | B2 | * | 2/2008  | Boas et al.        | 382/131 |
| 7,375,763 | B2 | * | 5/2008  | Alfonso et al.     | 348/448 |
| 2005/0111414 | A1 | * | 5/2005 | Liberti et al.    | 370/335 |
| 2006/0072844 | A1 | * | 4/2006 | Wang et al.       | 382/254 |
| 2007/0280404 | A1 |   | 12/2007 | Nielsen et al.   |         |
| 2007/0297656 | A1 | * | 12/2007 | DeMan et al.     | 382/128 |
| 2009/0275822 | A1 | * | 11/2009 | Detsky et al.    | 600/413 |

FOREIGN PATENT DOCUMENTS

EP    1958691 A1    8/2008

OTHER PUBLICATIONS

Park et al. "Measurements and Evaluation of the Image Noise Power Spectrum for Computed Radiography", IEEE, 2008, pp. 4378-4383.*

(Continued)

*Primary Examiner* — Matthew Bella
*Assistant Examiner* — Weiwen Yang

(57) ABSTRACT

A system for generating a reconstruction filter for an imaging scanner comprises a model bank that includes a model for generating the reconstruction filter, a filter criteria bank that includes filter criteria for generating the reconstruction filter, and a filter generator that generates the reconstruction filter based on the filter model and the filter criteria. In one non-limiting instance, the model is based on minimizing a cost function that includes predetermined filter criteria such as image contrast. In another non-limiting instance, the cost function includes terms relating to spatial resolution, noise and a signal visual perception in the presence of noise.

22 Claims, 2 Drawing Sheets

(56) References Cited

OTHER PUBLICATIONS

Farquhar, T. H., et al.; An Investigation of Filter Choice for Filtered Back-Projection Reconstruction in PET; 1997; IEEE Trans. on Nuclear Science Symposium; vol. 2; pp. 1042-1046.

Wei, Y., et al.; CT reconstruction filter design in the real space; 2004; Proc. of SPIE; 5535(1)628-635.

Wells, P., et al.; A Study of Errors due to Reconstruction Filters in Computed Tomography; 1996; Res Nondestr Eval; 8:149-163.

* cited by examiner

SYSTEM AND METHOD FOR GENERATING A TOMOGRAPHIC RECONSTRUCTION FILTER

CROSS REFERENCE TO RELATED APPLICATIONS

This application claims the benefit of U.S. provisional application Ser. No. 61/176,230 filed May 7, 2009, which is incorporated herein by reference.

The following generally relates to a reconstruction filter, and finds particular application to computed tomography (CT). However, it also amenable to other medical imaging applications and to non-medical imaging applications.

A computed tomography (CT) scanner generally includes an x-ray tube mounted on a rotatable gantry that rotates around an examination region about a longitudinal or z-axis and emits radiation. A detector array subtends an angular arc opposite the examination region from the x-ray tube. The detector array detects radiation that traverses the examination region (and a subject or object therein), and generates projection data indicative thereof. A reconstructor reconstructs the projection data based on a reconstruction algorithm such as a filtered back-projection reconstruction algorithm and generates volumetric image data indicative of the scanned subject or object. The volumetric image data can be processed to generate one or more images indicative of the scanned subject or object.

Conventional filtered back-projection reconstruction algorithms of cone beam CT have been based on a two dimensional (2D) image Fourier decomposition of the data followed by a Fourier composition. In general, a CT image of gray levels can be regarded as a 2D function of the X-ray attenuation coefficient within a slice of the subject or object. According to the Fourier theorem, this function can be decomposed into waves (Fourier components) that propagate in the transverse plane. As such, this function can be written as a linear combination or a superposition of waves. The waves are parameterized in the Fourier domain by the absolute value of their frequency k and by their direction given by the polar angle θ. During reconstruction, the amplitudes and the phases of the waves are estimated using processing steps based on the Radon slice theorem. The waves are then summed up to form the image.

The wave amplitudes estimated during the reconstruction are intentionally modified before the summation of the waves. This modification is controlled by the reconstruction filter. By way of example, due to the finite width of the X-ray beam, the amplitudes of the high-frequency waves estimated from the measurement are smaller than their real values within the X-ray attenuation correction map. Knowing in advance the frequency dependent ratio between the estimated values and the true values of the amplitudes (the modulation transfer function (MTF) of the system), the estimated amplitudes of the high-frequency waves can be emphasized to compensate for the drop of the MTF at these frequencies. However, de-emphasizing the values of the estimated amplitudes enables reducing the noise power spectrum (NPS) in the reconstructed image. The main origin for this noise is the Poisson probability distribution of the photons to reach the detectors.

Tailoring reconstruction filters for a particular scanner generally includes emphasizing and de-emphasizing certain frequency contents. Conventionally, optimizing a particular filter for a particular application has been performed based on user (e.g., radiologists, application specialist, etc.) feedback. Unfortunately, optimizing reconstruction filters empirically based on user feedback can extend the optimization process over a relatively long period of time. Furthermore, such optimization generally is limited to tuning the filter frequency dependence to a small group of functions spanned by a few pre-defined parameters.

Aspects of the present application address the above-referenced matters and others.

According to one aspect, a system for generating a reconstruction filter for an imaging scanner comprises a model bank that includes a model for generating the reconstruction filter, a filter criteria bank that includes filter criteria for generating the reconstruction filter, and a filter generator that generates the reconstruction filter based on the filter model and the filter criteria.

In another embodiment, a method includes minimizing a cost function represented as a sum of two terms, wherein a first term penalizes a loss of a spatial resolution attributed to an imaging system and a second term penalizes a loss of signal detection due to image noise.

In another embodiment, a computer readable storage medium containing instructions which, when executed by a computer, cause the computer to perform the acts of minimizing a cost function represented as a sum of a first term that penalizes a loss of a spatial resolution attributed to an imaging system and a second term that penalizes a loss of signal detection due to image noise.

In another embodiment, a method includes generating a filter by minimizing a cost function based on predetermined contrast criteria including terms relating to the loss of spatial resolution and terms relating to a loss of the visual signal perception in the presence of noise.

The invention may take form in various components and arrangements of components, and in various steps and arrangements of steps. The drawings are only for purposes of illustrating the preferred embodiments and are not to be construed as limiting the invention.

Figure 1:
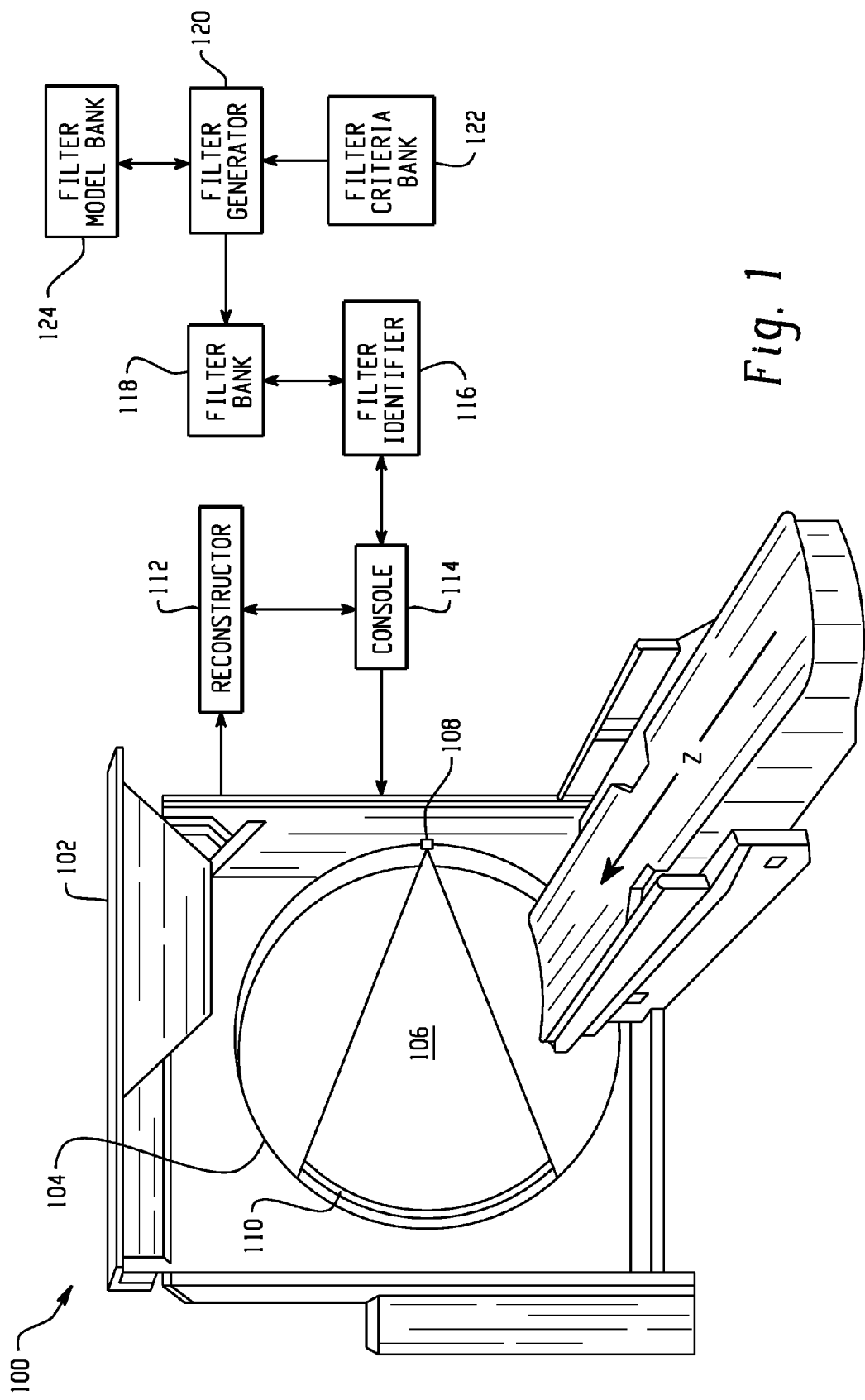
FIG. 1 illustrates an example imaging system.

FIG. 1 illustrates an imaging system or CT scanner 100. The imaging system 100 includes a stationary gantry 102 and a rotating gantry 104, which is rotatably supported by the stationary gantry 102 and rotates around an examination region 106 about a rotating frame rotation center along a longitudinal or z-axis. A radiation source 108, such as an x-ray tube, is supported by the rotating gantry 104. The radiation source 108 emits radiation. A source collimator collimates the emitted radiation to form a generally cone, fan, wedge, or otherwise shaped beam that traverses the examination region 106. A radiation sensitive detector array 110 subtends an angular arc opposite the radiation sources 108 across the examination region 106 and detects radiation traversing the examination region 106. The detector array 110 generates projection data or a signal indicative of the detected radiation. A patient support, such as a couch, supports an object or subject in the examination region 106.

A reconstructor 112 reconstructs the signal from the detector array 110 based on a selected reconstruction algorithm and generates volumetric image data indicative thereof. A general-purpose computing system serves as an operator console 114. Software resident on the console 114 allows the operator to control the operation of the system 100 by selecting the scanning protocol, accepting or changing the reconstruction filter for the selected protocol, etc. A filter identifier 116 identifies the selected filter in a filter bank 118, which may include a plurality of different filters (e.g., sharp, smooth, etc.) variously tuned for different applications.

A reconstruction filter generator 120 generates one or more reconstruction filters (e.g., sharp, smooth, etc.) that can be used by the reconstructor 112. The filter generator 120 can be part of the system 100 or remote from the system 100 such as part of a separate computer, workstation, or the like. The filter generator 120 can generate a reconstruction filter based on various pre-determined criteria stored in a filter criteria bank 122, a filter model stored in a filter model bank 124, and/or other information. By way of non-limiting example, in one instance the filter generator 120 generates a reconstruction filter (without user interaction such as without tuning of any parameters) based on predetermined image contrast criteria and a cost function. In other embodiments, the filter is otherwise generated.

The cost function can be represented in the Fourier domain as a sum of two integrals over k expressed in terms of the MTF and NPS of the system. The MTF and NPS depend on scanner geometry such as detector pixel size and the x-ray tube-to-detector distance and can be measured, simulated or approximated, without emphasizing or de-emphasizing the estimated wave amplitudes. This can be done by choosing the reconstruction filter values to be one for all frequencies that are lower than the frequency $v_c$ defined, as an example, as the cut-off frequency of the MTF. Generally, the first integral of the cost function corresponds to the loss of signal detection ability due to spatial smearing, and the second integral of the cost function corresponds to the loss of the ability to detect the signal due to image noise. The two integrals can contain similar or different integrants and may take into account a priori information.

As described in greater detail next, in one non-limiting instance the filter is generated by minimizing a cost function. For this example, the cost function is represented in terms of a signal power spectrum (SPS), which represents the statistical energy distribution of the signal in the Fourier domain. In CT, the SPS can be defined based on an ensemble of attenuation correction maps, and the dependence of the SPS on the wave frequency can be represented as shown in EQUATION 1:

$$SPS=SPS(k,r), \qquad \text{EQUATION 1:}$$

where k represents an absolute value of the frequency and r represents a distance between an image pixel and the rotating frame rotation center. Assuming the dependence on r is not significant, the SPS can be represented as shown in EQUATION 2:

$$SPS(k) \propto \left(\frac{k_0}{k}\right)^p, \; p \sim 1.9, \qquad \text{EQUATION 2}$$

With the illustrated embodiment, the reconstruction filters slightly vary for p in a range of one (1) to one and nine tenths (1.9).

The loss of resolution in the cost function can be penalized by considering the power spectrum of an error image taken as the difference between an image obtained for a given reconstruction filter F(k), excluding noise and aliasing artifact, and an image that represents the radiation attenuation coefficient map. Based on the above, the integrant of the first integral of the cost function can be represented as a quadratic relationship between the amplitudes and the power spectrum as shown in EQUATION 3:

$$INT_s(k) \propto SPS(k) \cdot (1-MTF(k) \cdot F(k))^2. \qquad \text{EQUATION 3:}$$

In this example, the second integral of the cost function takes into account the function I(k'/k), where k' and k respectively represent the frequency absolute values of a signal wave and of a noise wave. The function I(k'/k) describes how the frequency ratio k'/k influences the ability of a human observer to detect the signal in the presence of the noise component.

Various definitions can be used to for I(k'/k). The following describes a suitable example. Consider a signal image composed of only one sinusoid such as a plane wave with a frequency absolute value of k' oscillating within the image around zero. Consider also a noise image formed by creating a white noise image (with no correlation between the values of neighbor pixels) using a random Gaussian generator centered at zero. A 2D Fourier de-composition can be performed on the white noise image, and the amplitudes can be set to zero for all waves except those having frequencies with an absolute value that falls between k−δ and k+δ. A Fourier composition can then be performed on the de-composed signal.

Note that the noise image obtained by the above steps contains waves of different directions (θ). In other words, these waves occupy a ring in the frequency domain bounded by the radii k−δ and k+δ. The variance of the noise image and of the signal image described above can be expressed as shown in EQUATION 4:

$$\sigma = \lim_{N\to\infty} \frac{\sum_{s=1}^{N}\left(i(s) - \sum_{q=1}^{N} i(q)/N\right)^2}{N-1} \qquad \text{EQUATION 4}$$

where N is a number of image pixels and i(s)\i(q) is a value of the image in pixel s\q. The signal image variance can be increased so that a human observer would detect the signal when the noise image is added to the signal image. Alternatively, the signal image variance can be decreased so that the human observer would not detect any more signal after the noise image is added to the signal image.

Consider therefore the minimal ratio between the signal image variance and the noise image variance in which the observer still detects the signal. Allowing the observer to zoom in and out of the image, this minimal variance ratio depends only on the ratio between k' and k. In one embodiment, I(k'/k) is considered as this minimal ratio. In one instance, I(k'/k) can be empirically estimated. The empirical measured points can be fit later to a Gaussian dependence of I on log(k'/k).

The following discusses how to include in the cost function the amount by which the informative signal is degraded due to the noise waves lying within a ring shaped region of frequencies having absolute values centered at k. This amount is proportional to the product of NPS(k) by the square of the reconstruction filter at that k denoted by F(k). As such, the integrant of the second integral generally follows EQUATION 5:

$$INT_{noise}(k) \propto NPS(k) \cdot F(k)^2, \qquad \text{EQUATION 5:}$$

where NPS(k) represents the noise power spectrum at k obtained for using F(k)=1 for all frequencies lower than $v_c$. As such, EQUATION 5 can be used to determine the noise power density at k.

The integrant of the second integral can also be proportional to the effectiveness in which this power density can degrade the detection of the signal distributed by SPS (k). In one embodiment, this effectiveness can be estimated as the integral of I(k'/k) over the signal frequency k' weighted according to the value of the signal power spectrum at this frequency as shown in EQUATION 6:

$$e_n(k) = \int_0^{v_c} dk' k' \cdot SPS(k') \cdot I(k', k),\quad \text{EQUATION 6}$$

where k' is the Jacobian determinant of the transformation matrix from Cartesian to polar coordinates. As noted above, SPS (k') represents an ensemble of attenuation coefficient maps. In one instance, the ensemble can be translated to an ensemble of reconstructed CT images, for example, by multiplying the integrant in EQUATION 6 by MTF $(k')^2 \cdot F(k')^2$.

From EQUATIONS 5 and 6, the integrant of the cost function includes products of $F(k)^2 \cdot F(k')^2$. However, in another embodiment as an approximation $F(k')^2$ in EQUATION 6 is replaced by one, which can simplify the solution for the filter F(k) and provide a global minimum for the cost function. $e_n(k)$ in EQUATION 6 can also be expressed as a dimensionless function in terms of a weighted average of $I(k'/k)$ as shown in EQUATION 7:

$$e_n^A(k) = \frac{\int_0^{v_s} dk' k' \cdot SPS(k') \cdot MTF(k')^2 \cdot I(k',k)}{\int_0^{v_c} dk' k' \cdot SPS(k') \cdot MTF(k')^2},\quad \text{EQUATION 7}$$

where A represents either an approximation or an average over k'.

From EQUATIONS 1, 3, 5 and 7, the cost function can be represented as shown in EQUATION 8:

$$E_\alpha(F(k)) = \int_0^{v_c} dk k \cdot SPS(k) \cdot (1 - MTF(k) \cdot F(k))^2 + \alpha \cdot \int_0^{v_c} dk k \cdot NPS(k) \cdot e_n^A(k) \cdot F(k)^2,\quad \text{EQUATION 8}$$

where $E_\alpha(F(k))$ represents a functional, or scalar, value that depends on the reconstruction filter F(k). The parameter $\alpha$ that multiplies the second term of the cost function is used to balance between the signal degradation caused by the loss of spatial resolution and that caused by noise. In one embodiment, this parameter is calculated automatically together with the reconstruction filter F(k) as described next.

The image noise variance at the point (x, y) can be represented as shown in EQUATION 9:

$$\sigma(x,y) = \left(\frac{\pi}{M_{proj}}\right)^2 \cdot 2 \cdot \tau \cdot \left(\sum_{i=1}^{M_{proj}} \frac{1}{\bar{N}(x,y,\theta(i))}\right) \cdot \int_0^{v_c} dk k^2 F(k)^2,\quad \text{EQUATION 9}$$

where $M_{proj}$ represents a number of projections back-projected to the pixel, $\tau$ represents the radial increment between the readings, and $\bar{N}(x, y, \theta(i))$ represents a mean value of the number of photons that reach the detector belonging to the reading of the projection angled along $\theta$ that is intersecting the point (x, y).

The ratio between the image noise variance obtained using the reconstruction filter F(k) and the image noise variance obtained by replacing all its values by one (1) can be represented as shown in EQUATION 10:

$$rv(F(k)) \equiv \sigma(F(k))/\sigma(F(k) \Rightarrow 1)\quad \text{EQUATION 10}$$

$$= \frac{\int_0^{v_c} dk k^2 F(k)^2}{\int_0^{v_c} dk k^2}.$$

Due to different effects like fan-to-parallel re-binning of the projections, cross-talk between the detector pixels and others, the dependence of ry on F(k) may differ from the approximation in EQUATION 10. However, it can still be calculated based on the measured or simulated NPS(k) as shown in EQUATION 11:

$$rv(F(k)) = \frac{\int_0^{v_c} dk k NPS(k) F(k)^2}{\int_0^{v_c} dk k NPS(k)}\quad \text{EQUATION 11}$$

In one instance, for a given value of rv(F(k)) denoted by $rv_g$, the parameter $\alpha$ and the filter F(k) are calculated together automatically by the following fast converging iterative procedure. By way of example, $\alpha$ is set to $\alpha_0=1$, and $F_0(k)$ is calculated as the filter that minimizes the cost function $E_{\alpha_0}(F(k))$. This can be expressed as shown in EQUATION 12:

$$F_0(k) = \min_{\{F(k)\}} E_{\alpha_0}(F(k)).\quad \text{EQUATION 12}$$

n iterations are performed as shown in EQUATION 13:

$$\alpha_1 = \frac{\alpha_0 \cdot rv(F_0(k))}{rv_g} \quad F_1(rv_g, k) = \min_{\{F(k)\}} E_{\alpha_1}(F(k))\quad \text{EQUATION 13}$$

$$\alpha_2 = \frac{\alpha_1 \cdot rv(F_1(k))}{rv_g} \quad F_2(rv_g, k) = \min_{\{F(k)\}} E_{\alpha_2}(F(k)) \ldots$$

$$\ldots$$

$$\alpha_n = \frac{\alpha_{n-1} \cdot rv(F_{n-1}(k))}{rv_g} \quad F_n(rv_g, k) = \min_{\{F(k)\}} E_{\alpha_n(F(k))},$$

with stopping criterion set for $F_n(rv_g, k)$ as shown in EQUATION 14.

$$\text{abs}\left(\frac{rv(F_n(rv_g, k))}{rv_g} - 1\right) \leq \varepsilon,\quad \text{EQUATION 14}$$

where a typical value for $\epsilon$ is about $10^{-4}$, and the reconstruction filter can be expressed as shown in EQUATION 15:

$$F(rv_g, k) = F_n(rv_g, k).\quad \text{EQUATION 15}$$

Present commercial CT scanners contain a group of reconstruction filters that offer a set of different values for rv(F(k)). For embodiments herein, the values for $rv_g$ can optionally be set according to this set. Changing the scanner geometry by reducing, for example, the pixel size can motivate the inclusion of new values for $rv_g$, higher in this case. In any case, even when the value of $rv_g$ taken for the new filter equals to that of the old filter, the frequencies are emphasized or deemphasized differently by the old filter and by the new optimal filter obtained by EQUATIONS 8 and 12-14.

Based on EQUATION 7, a reconstruction filter that minimizes the cost function in EQUATION 8 can be represented as show in EQUATION 16:

$$F_i(k) = \frac{MTF(k)}{MTF(k)^2 + \alpha_i \cdot (k/k_0)^p \cdot NPS(k) \cdot e_n^A(k)}. \quad \text{EQUATION 16}$$

In instance where NPS(k~0)=0 and MTF(k~0)=1, EQUATION 16 renders a zero derivative of $F_i$(k) at k=0. Due to the finite width of the beams, the MTF(k) often drops down before NPS(k). Based on EQUATION 16, within the region where $\alpha_i \cdot (k/k_0)^p \cdot NPS(k) \cdot e_n^A(k) \gg MTF(k)$, F(k) may rapidly drop.

Figure 2:
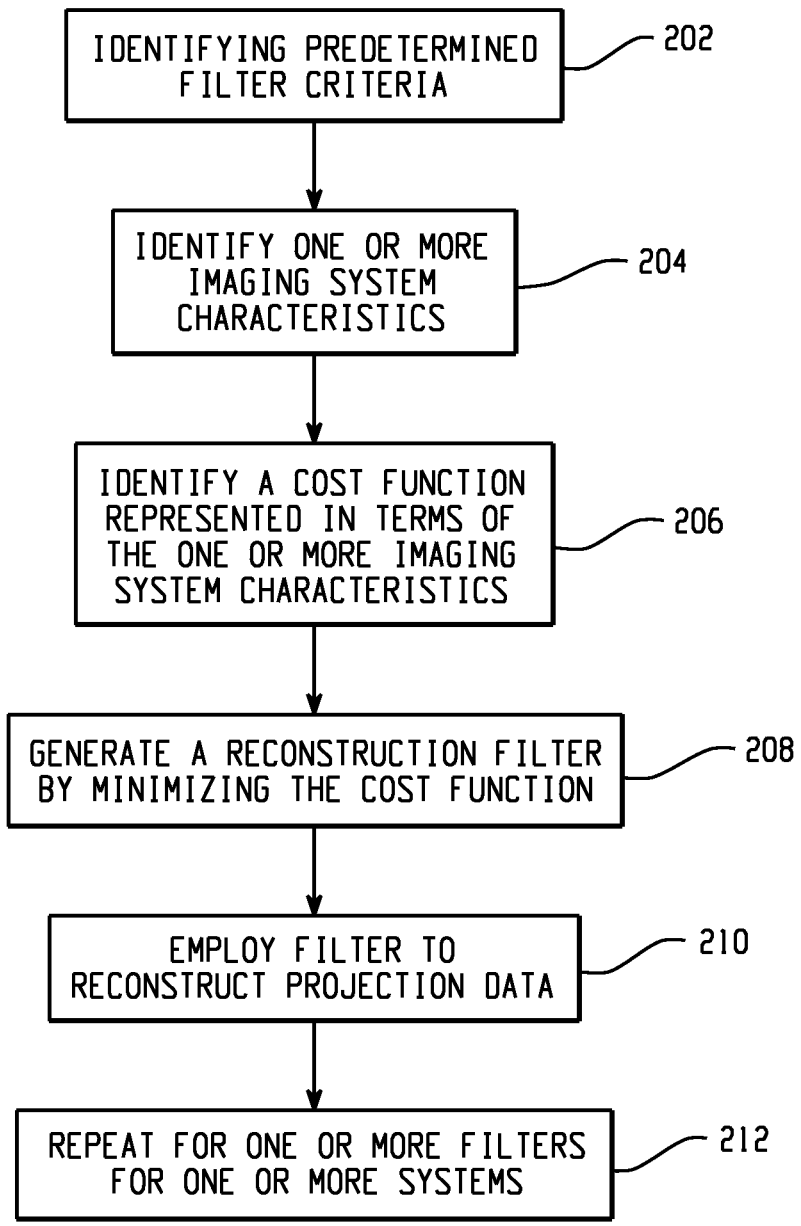
FIG. 2 illustrates an example method.

FIG. 2 illustrates a method for automatically generating a reconstruction filter for an imaging system. At 202, predetermined filter criteria is identified. For this example, the criteria is image contrast, including the ability of a human observer to detect the signal in the presence of noise, and the filter is generated to optimize the predetermined image contrast criteria. In other embodiments, the filter can be generated based on other criteria. At 204, imaging characteristics of the system such as an MTF, an NPS, an SPS and/or other characteristic of the system are identified. As noted above, the MTF and the NPS can be measured, simulated or approximated. At 206, a cost function represented in terms of the imaging characteristics is identified. At 208, a filter is generated by minimizing the cost function based on the predetermined filter criteria, the MTF, and the NPS. As described herein, the cost function can be represented in the Fourier domain over the frequencies (k) of the waves. Such a cost function can take into account the loss of signal detection ability due to spatial smearing and the loss of the ability to detect the signal due to image noise. At 210, the filter is employed to reconstruct projection data generated by an imaging system. At 212, the above can be repeated for one or more filters and/or one or more similar or different imagines systems.

The above can be implemented as a console application of a scanner and/or an image processing or planning workstation. By way of example, the above may be implemented by way of computer readable instructions, which when executed by a computer processor(s) (a processor of the console or workstation), cause the processor(s) to carry out the described acts. In such a case, the instructions are stored in a computer readable storage medium associated with or otherwise accessible to the relevant computer.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A system for generating a reconstruction filter for an imaging scanner, comprising:
    a model bank memory that includes a filter model for generating the reconstruction filter, wherein the filter model includes a cost function including a sum of two terms, including a first term that penalizes a loss of a spatial resolution attributed to the imaging scanner and a second term that penalizes a loss of signal detection due to image noise, wherein the second term is a function of a predetermined signal-to-noise ratio that corresponds to an approximation of a minimal signal-to-noise variance ratio at which a human observer is able to discern a known signal from noise;
    a filter criteria bank memory that includes filter criteria for generating the reconstruction filter; and
    a filter generator, executed by a microprocessor, that generates the reconstruction filter based on the filter model and the filter criteria.

2. The system of claim 1, wherein the cost function includes only the two terms.

3. The system of claim 1, wherein the cost function models degradation of the filter criteria.

4. The system of claim 2, wherein the filter generator generates the filter by minimizing the cost function.

5. The system of claim 1, wherein the filter criteria includes optimizing image contrast.

6. The system of claim 1, wherein the reconstruction filter is represented as:

$$\frac{MTF(k)}{MTF(k)^2 + \alpha_i \cdot (k/k_0)^p \cdot NPS(k) \cdot e_n^A(k)},$$

where MTF is a modulation transfer function, $\alpha_i \cdot (k/k_0)^p \cdot NPS(k) \cdot e_n^A(k) \gg MTF(k)$, k represents an absolute value of a frequency, α represents a parameter, NPS represents a noise power spectrum, e represents an estimated effectiveness in which a power density degrade the detection of a signal distributed by a signal power spectrum, i, 0, and n are subscripts, p is a power, and A represents an approximation or an average.

7. The system of claim 6, wherein the first and second terms depend on a modulation transfer function of the scanner, a noise power spectrum of the scanner, and a statistically averaged signal power spectrum of the scanned subject or object.

8. The system of claim 1, wherein the cost function is represented in terms of a signal power spectrum.

9. The system of claim 1, wherein the loss of resolution in the cost function is penalized based on a power spectrum of an error image taken as a difference between an image obtained for a given reconstruction filter, excluding noise and aliasing artifact, and an image that represents a radiation attenuation coefficient map.

10. The system of claim 1, wherein the signal-to-noise variance ratio is a ratio between a variance of a single sinusoid signal at particular frequency and between a variance of an isotropic noise image containing a noise power spectrum that is finite only on a ring of a finite width in a Fourier domain.

11. The system of claim 10, wherein the minimal signal-to-noise variance ratio is measured empirically and smoothed using a Gaussian fit.

12. The system of claim 6, wherein the filter generator minimizes the cost function through a balancing parameter that balances the first and second terms.

13. The system of claim 12, wherein the balancing parameter is determined through at least one predefined parameter.

14. The system of claim 13, wherein the predefined parameter is a ratio between an image noise variance corresponding to an optimized filter and an image noise variance corresponding to a predetermined reference filter.

15. The system of claim 14, wherein the predetermined reference filter has values equal to one and rapidly decreases at a predefined frequency.

16. The system of claim 14, further including determining the balancing parameter and the optimized filter simultaneously based on an automatic converging iterative approach.

17. The system of claim 1, wherein the system includes a computer tomography scanner.

18. A non-transitory computer readable storage medium containing instructions which, when executed by a computer, cause the computer to perform an act of:

generating a reconstruction filter by minimizing a cost function including only two terms represented as a sum of a first term that penalizes a loss of a spatial resolution attributed to an imaging system and a second term that penalizes a loss of signal detection due to image noise, wherein the second term is based on a predetermined approximation of a minimal signal-to-noise variance ratio at which a human observer is able to discern a known signal from noise.

19. The computer readable storage medium of claim 18, wherein the first and the second terms are functions of a modulation transfer function of the imaging system and of a noise power spectrum of the imaging system.

20. The computer readable storage medium of claim 18, wherein the cost function is minimized based on a balancing parameter that balances the first and second terms.

21. The computer readable storage medium of claim 20, wherein the balancing parameter is determined according to a predefined ratio between an image noise variance corresponding to an optimized filter and the image noise variance corresponding to a predefined reference filter.

22. A method for generating a reconstruction filter for an imaging scanner, comprising:

obtaining from model memory a filter model that includes a cost function including a sum of two terms, including a first term that penalizes a loss of a spatial resolution attributed to the imaging scanner and a second term that penalizes a loss of signal detection due to image noise, wherein the second term is a function of a predetermined signal-to-noise ratio that corresponds to an approximation of a minimal signal-to-noise variance ratio at which a human observer is able to discern a known signal from noise;

obtaining from filter criteria memory filter criteria for generating the reconstruction filter; and with a microprocessor, the reconstruction filter based on the filter model and the filter.

* * * * *